(No Model.)

T. F. LONNEY.
SUBMARINE ROCK BREAKER.

No. 315,520. Patented Apr. 14, 1885.

(No Model.) 7 Sheets—Sheet 2.
T. F. LONNEY.
SUBMARINE ROCK BREAKER.

No. 315,520. Patented Apr. 14, 1885.

(No Model.) 7 Sheets—Sheet 3.

T. F. LONNEY.
SUBMARINE ROCK BREAKER.

No. 315,520. Patented Apr. 14, 1885.

Witnesses
J. Staib
Chas H. Smith

Inventor
Thomas F. Lonney
per Lemuel W. Serrell
Atty (No Model.) 7 Sheets—Sheet 4.

T. F. LONNEY.
SUBMARINE ROCK BREAKER.

No. 315,520. Patented Apr. 14, 1885.

Witnesses:
J. Staib
Chas. H. Smith

Inventor:
Thomas F. Lonney
per Lemuel W. Serrell
Atty.

N. PETERS. Photo-Lithographer, Washington, D. C.

(No Model.) 7 Sheets—Sheet 6.

T. F. LONNEY.
SUBMARINE ROCK BREAKER.

No. 315,520. Patented Apr. 14, 1885.

(No Model.) 7 Sheets—Sheet 7.

T. F. LONNEY.
SUBMARINE ROCK BREAKER.

No. 315,520. Patented Apr. 14, 1885.

Witnesses:
J. Staib
Chr. H. Smith

Inventor
Thomas F. Lonney
per Lemuel W. Serrell
Atty

UNITED STATES PATENT OFFICE.

THOMAS F. LONNEY, OF EAST NEW YORK, N. Y.

SUBMARINE ROCK-BREAKER.

SPECIFICATION forming part of Letters Patent No. 315,520, dated April 14, 1885.

Application filed June 14, 1884. (No model.)

*To all whom it may concern:*

Be it known that I, THOMAS F. LONNEY, of East New York, in the county of Kings and State of New York, have invented an Improvement in Submarine Rock-Breakers, of which the following is a specification.

This invention relates to improvements upon and modifications of the devices shown in my application filed January 7, 1884, Serial No. 116,618. The devices shown and claimed in said application therefore are not claimed herein.

The mode of operation of this machine is somewhat similar to that in aforesaid application. A plow or disrupter is fastened to the lower end of a frame, and toggle-bars and right and left hand screws are employed to give an up-and-down movement to the disrupter as the apparatus is drawn along, the object being to introduce the disrupter beneath the layer of phosphate rock and lift the same, so as to raise and break up such layer, and then draw the apparatus along as the disrupter is forced down and then again raised to disrupt the layer of phosphate or other rock below the water. The rock as broken up is to be lifted by any suitable grapple or dredge.

In the drawings, Fig. 4 is a section of the disrupter and the chain-clamp. Fig. 5 is a plan of the same. Fig. 6 is a section, and Fig. 7 a sectional plan, of the clamp for the toggle-bars. Fig. 15 is a plan of the hammer and section of the frame it slides in.

Figure 3:
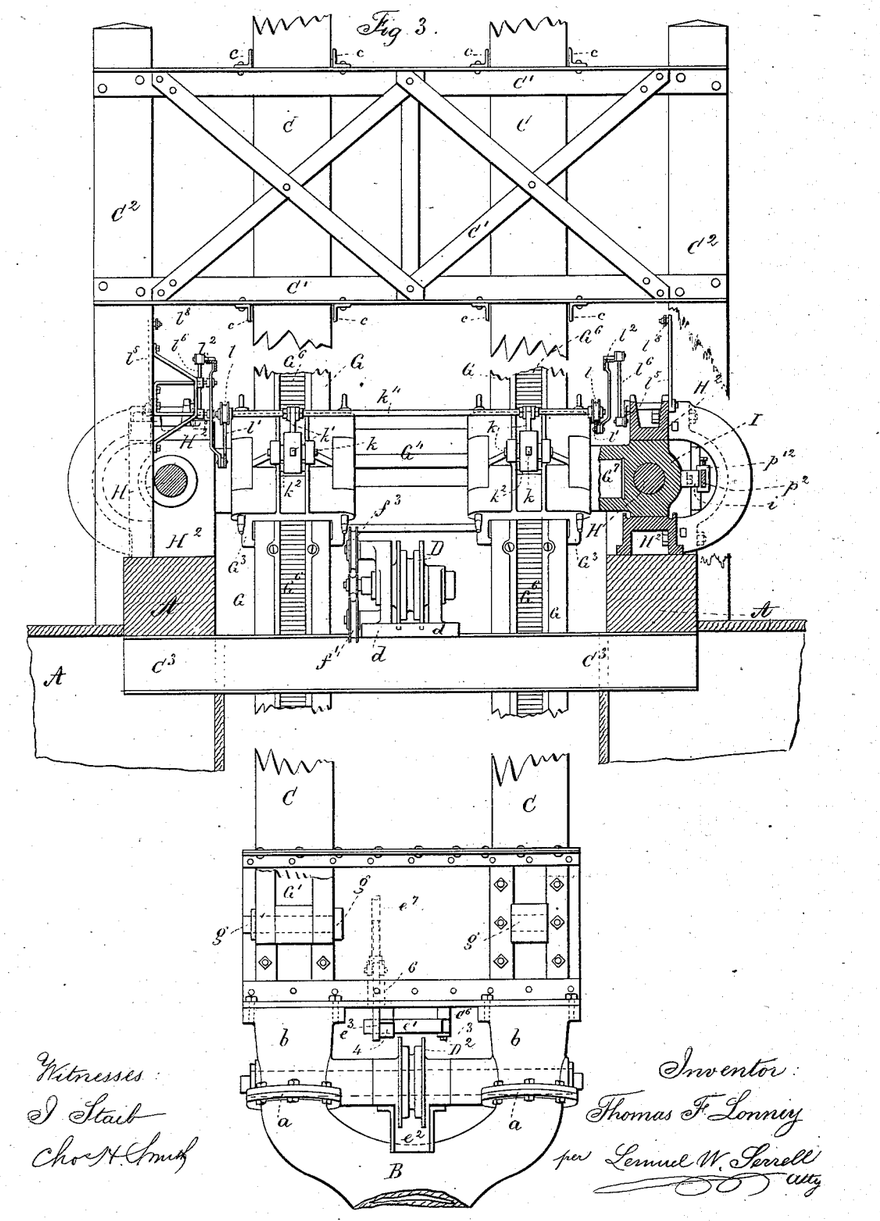
Fig. 3 is a cross-section in larger size.
Figures 4, 5, 6, 7:
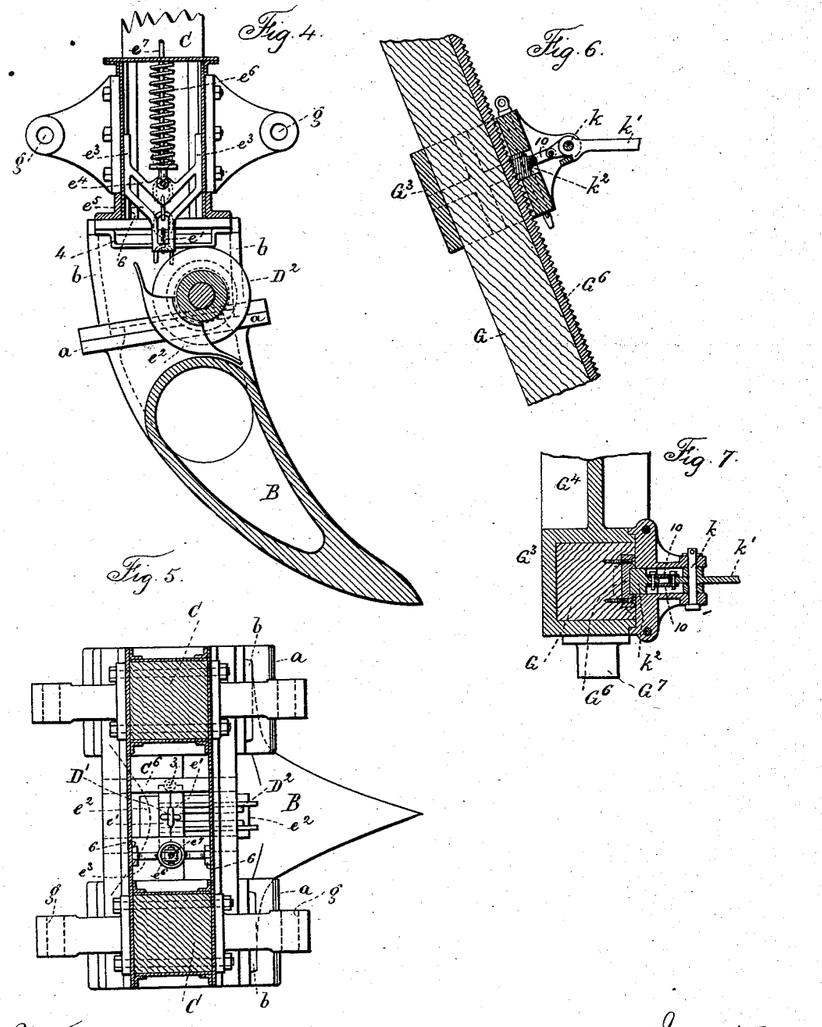

The apparatus is placed upon a scow or floating vessel of suitable size and character. Portions of this scow are shown at A. Through this scow is an opening or well-hole, through which the frames and parts carrying the disrupter or plow pass. The disrupter or plow B is composed of either one or two prongs of suitable size and strength. They are preferably hollow, and at the upper end the disrupter is made with flanges $a$, that are attached to the castings $b$ at the lower ends of the vertical timbers C, forming a frame that slides vertically through the guides $c$ upon the cross-frame C', that is supported by the stanchions $C^2$, that rise above the float A. There are also beams $C^3$, that cross the opening in the scow near the level of the deck, which also form guide-supports for the frame C, and also carry a bed-plate, $d$, and chain-wheel D, over which the chain D' passes. This chain D' goes beneath the chain-wheel $D^2$, that is adjacent to the disrupter and between the timbers C, and extends to an anchor or spile, E, driven into the bed of the river, as hereinafter described. There is a shoe, $e^2$, below the chain-wheel $D^2$, to prevent the chain D' slipping off the chain-wheel when loose. The chain D' passes along horizontally and around the chain-windlass $D^4$ and guide-wheel $D^5$ down into the hold of the scow. It will now be understood that when the chain D' is drawn upon by the rotation of the windlass the chain will act to draw the disrupter toward the spile or anchor with the force due to the action of the windlass. I remark that this windlass may be of any desired character; but the form and construction hereinafter described are preferred. If the chain D', as it passes between the chain-wheel D and the wheel $D^2$, is clamped firmly to the frame C, the power of the windlass can be used to raise the frame C and the disrupter; or it may be lowered by a reverse movement given to the windlass. There is a cross-pin, $C^6$, at the lower part of the frame C, (see Fig. 5 and lower part of Fig. 3,) and to it there are jaws $e'$, pivoted at 3, so that they can be opened or closed horizontally, and the moving ends are within the slotted guide-bar 4, so as to be firmly supported thereby. Adjacent to the ends of the jaws where they project beyond the slotted guide-bar there are vertical guides 6, in which the metal frame $e^3$ slides, and this frame has in it bars $e^4 e^5$, which are V-shaped;

and there is a spring, $e^6$, to press the frame $e^3$ downwardly, and a rod, $e^7$, passing through the spring, and by which the frame $e^3$ can be raised. In the normal position the V-bar $e^4$ is pressed between the ends of the jaws $e'$, to spread them apart and out of the way of the chain D', that passes between them. When the frame $e^3$ is raised, the V-bar $e^5$ acts to move the ends of the jaws $e'$ toward each other and close said jaws around one of the chain-links and clamp the same. The bottom portion of the V-shaped bar $e^5$ is made as a square mortise or loop, that receives the ends of the jaws $e'$ and holds them securely until the spring $e^6$ is again allowed to force the frame $e^3$ downwardly and open the jaws. A small chain or wire rope, $f$, is attached to the rod $e^7$, and passes around the sheaves $f'$, $f^2$, and $f^3$, and thence to the upper part of the frame C. The sheaves $f'$ $f^3$ are in a fixed position, and the sheave $f^2$ may be moved horizontally by a jaw and rod, $f^4$, to the lever $f^5$. When the frame C is raised or lowered with the disrupter by the chain D' or by the other means hereinafter described, the chain or rope $f$ will simply run around the respective sheaves $f'$ $f^2$ $f^3$ and maintain the same tension; hence, if the sheave $f^2$ is drawn away from the sheaves $f'$ $f^2$, so as to raise up the frame $e^3$ and clamp the chain, the clamp will not be loosened by raising or lowering the frame C, and if the sheave $f^2$ is allowed to approach the sheaves $f'$ $f^3$, so as to allow the spring $e^6$ to force down the slide-frame $e^3$ and open the jaws $e'$ by the V-shaped bar $e^4$, the jaws will so remain and not be closed by raising or lowering the frame C and disrupter. If the phosphate rock or similar material operated upon is only a thin layer, the devices before described for raising or lowering the frame C' and the disrupter and for drawing the same along may be sufficient for drawing the disrupter along until the inclined end of the point passes in beneath the layer of rock, after which the clamp is to be closed and the chain D' drawn upon to lift the disrupter and raise up and crack into pieces the layer of phosphate rock, so that it can be grappled or dredged. Usually, however, the thickness of this layer of phosphate rock is too great to be broken conveniently by the force of the chain. I therefore combine with the disrupter and its frame the toggle-bars G G' and right and left handed screws H H' and their connected parts. The toggle-bars G G' are hinged at $g$ to the casting at the lower ends of the frame C. The screws H H' are between the longitudinal frames $H^2$ $H^3$, and the screws pass through nuts I, that are between the frames $H^2$ $H^3$, and can be moved back and forth by such screws when rotated. Each toggle-bar G or G' is provided with a rack, $G^6$, running longitudinally of its face, and it is placed within the metallic box $G^3$. These boxes $G^3$ are connected in pairs by the bars $G^4$, and there are trunnions $G^7$ at the outer portions of the boxes $G^3$, by which the boxes and nuts I are connected together, and upon which the boxes can turn as the nuts I are moved along by the rotation of the right and left hand screws and the angles of the toggle-bars to such screws changed. Each box $C^3$ is open at one side and extended to receive the cross-shaft $k$ (see Figs. 6 and 7) of the lever $k'$, and to the end of the lever a clamping-jaw, $k^2$, is connected by the links 10. The face of the clamping-jaw is made with teeth corresponding to those upon the racks that are let into the face of the toggle-bar. These levers $k'$ are connected in pairs by the cross-shafts $k^4$. Weights upon the levers tend to move the outer ends of the levers downwardly and draw the clamps $k^2$ away from the racks whenever the cross-shafts $k^4$ are allowed to descend. In their normal position for work the cross-shafts $k^4$ are sustained by wheels $l$ at their ends, that rest upon the rails $l'$; but when these rails $l'$ are lowered the levers $k'$ swing down, the clamp-blocks $k^2$ are drawn away from the racks $G^6$, and the toggle-bars G G' can slide endwise in the boxes $G^3$ as the frame C' and disrupter are raised or lowered bodily by the action of the chain D' and windlass, before described. The rails $l'$ are connected to the bars $l^2$, forming frames that can be moved up or down bodily in the end slide-standards, $l^4$. To give this movement I use three or more bell-cranks or bent levers, $l^5$, connected to each frame by the links $l^6$, and the bent levers are connected together by the rods $l^8$, and these pass to the cranks $l^9$ and shaft $m$, to which a lever, $n$, is applied for moving the parts and raising and lowering the frames for the purposes aforesaid. The lever $n$ should be held in its normal position by any suitable catch or friction-clamp. The rails $l'$ should be inclined downwardly toward the middle, so as to maintain the lever $k'$ nearly at right angles to the toggle-bars G G' when the nuts I are being drawn toward each other and the toggle-bars brought nearer vertical, or the reverse. The screws H H' are geared in such a manner as to be rotated together. As a convenient means for effecting this, I have shown the miter-gears $o$ $o'$ and cross-shaft $o^2$, and this is to be rotated by suitable power, and when the screws with the right and left hand threads are revolved in such a direction that the nuts I are moved away from each other the frame C' and disrupter B are raised by the toggle-bars G G' with a very powerful motion, and one that is slow at first and more rapid as the nuts and toggle-bars become separated to a greater distance. The reverse movement forces down the disrupter.

Figure 1:
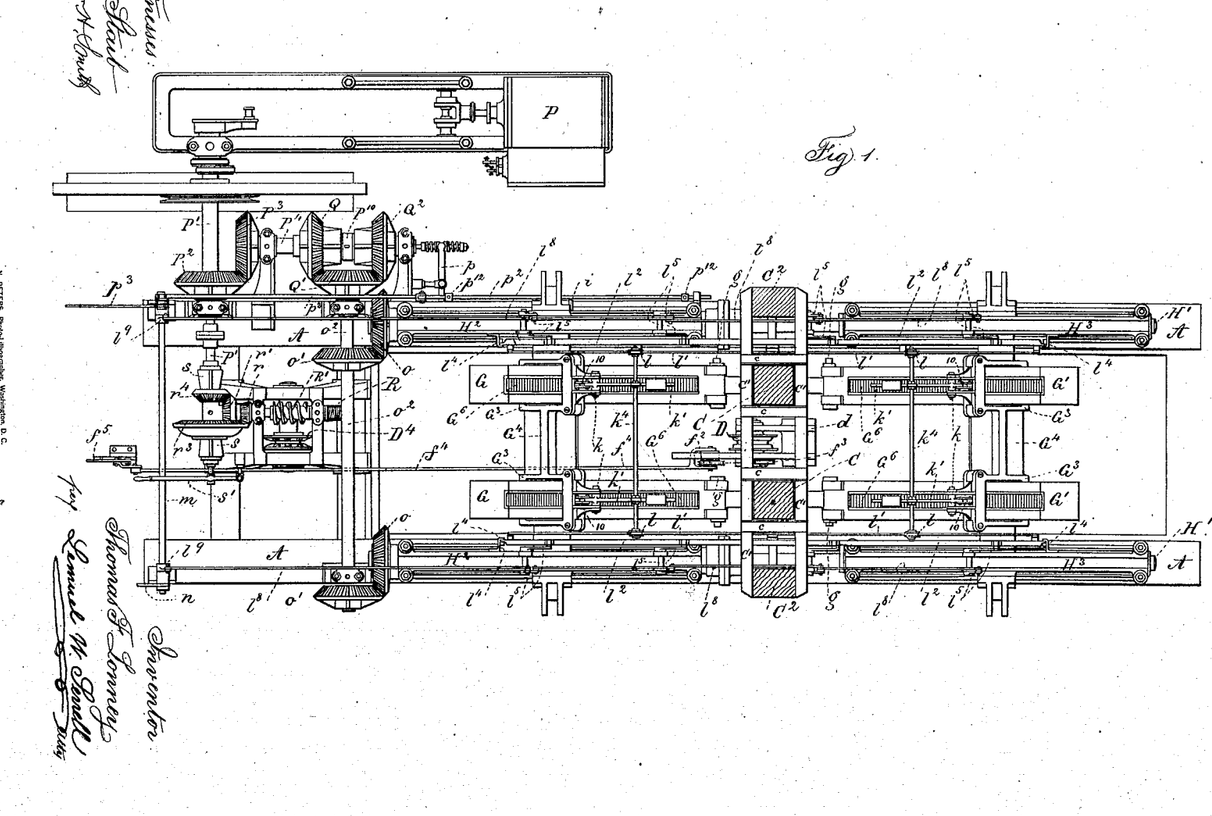
Figure 1 is a general plan view.
Figure 2:
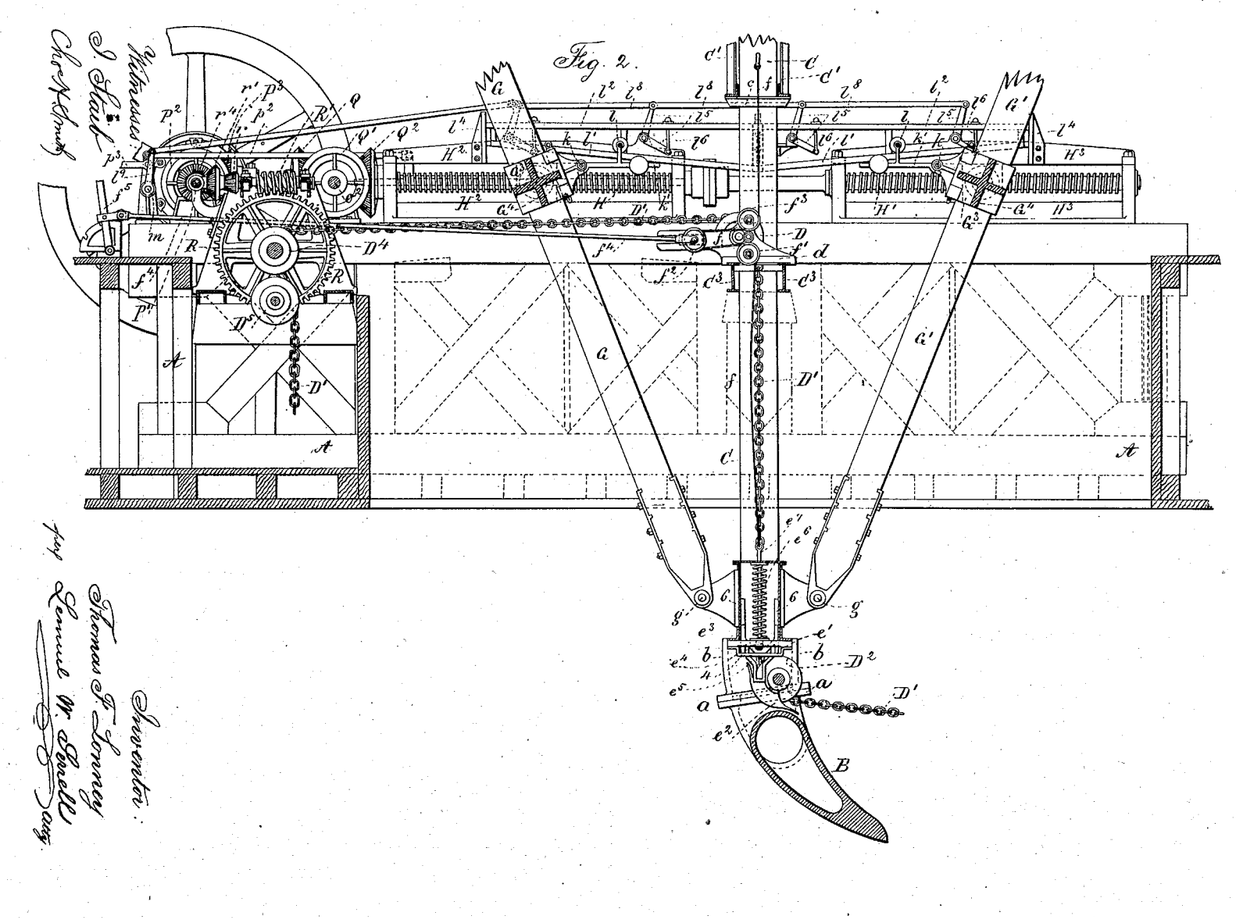
Fig. 2 is a vertical longitudinal section of the apparatus.
Figures 8, 9:
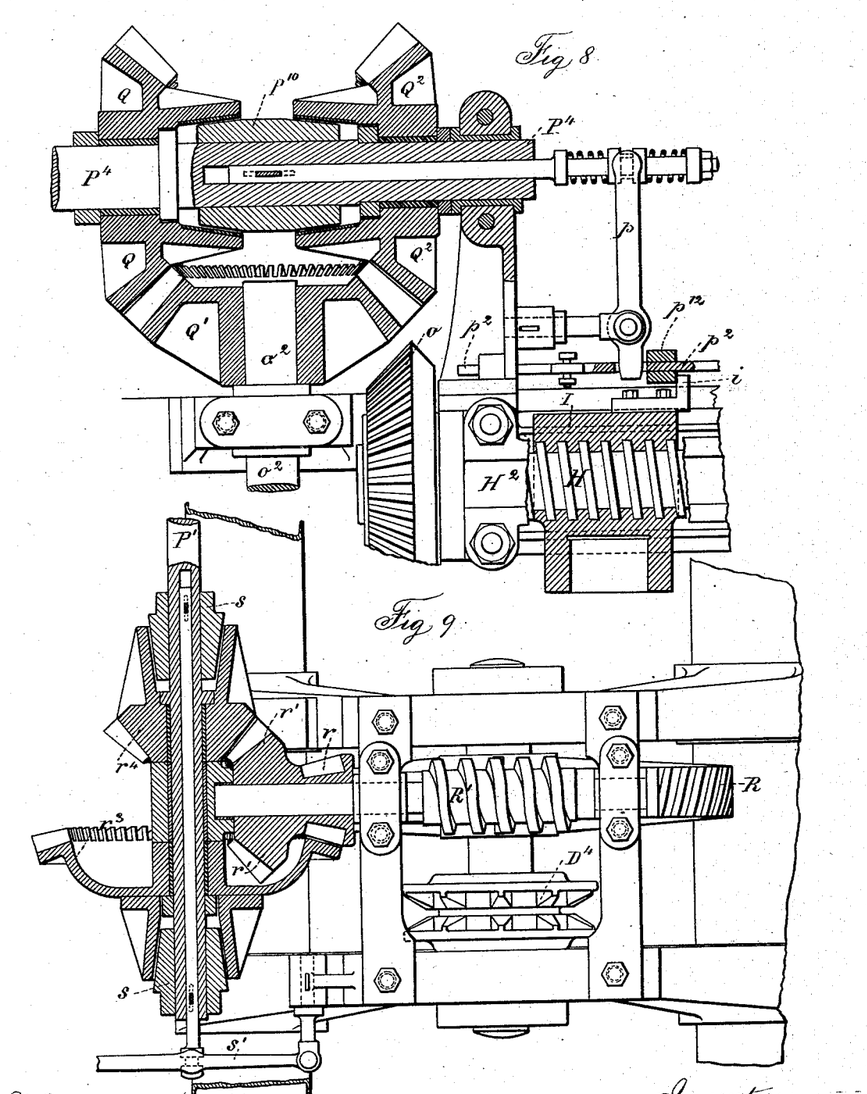
Fig. 8 is a sectional plan, in larger size, of the conical friction-coupling for reversing the movement of the screws.
Fig. 9 is a similar view, in larger size, of the conical friction-coupling for changing the direction and speed of the chain-wheel.
Figures 10, 11, 12:
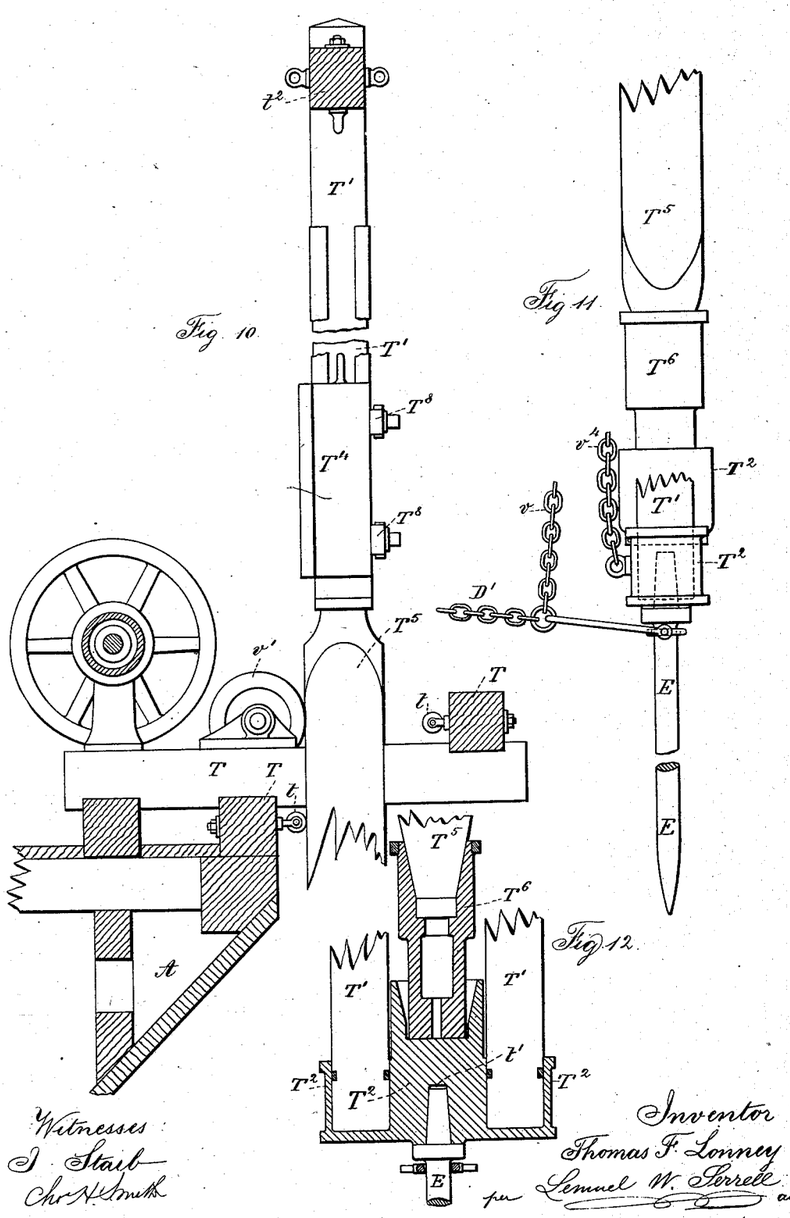
Fig. 10 is a side view, partially in section, of the upper part of the frame for driving the anchor.
Fig. 11 is a side view of the lower part of said frame.
Fig. 12 is a section of the shoe and lower part of said frame.
Figure 13:
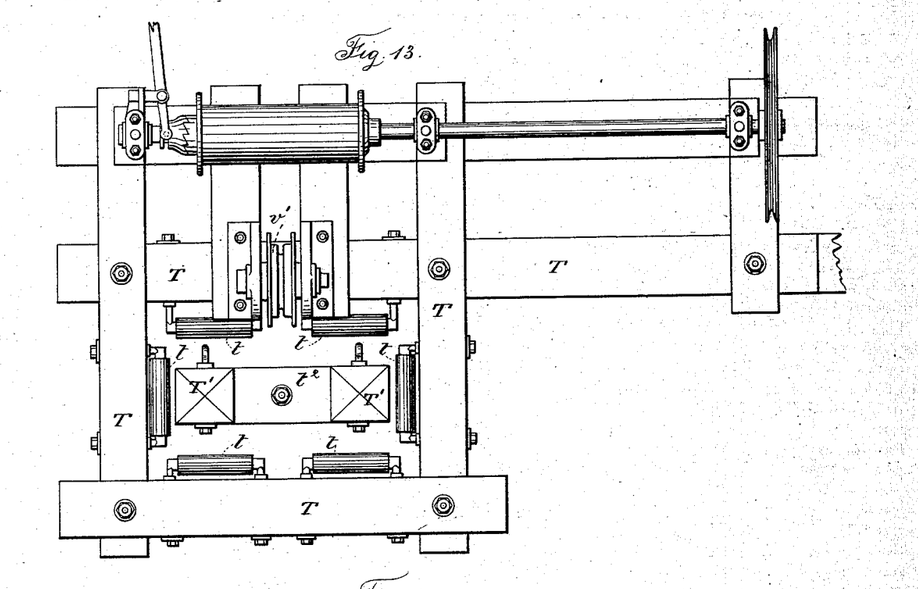
Fig. 13 is a plan view of the mechanism for driving the anchor.

I have shown an engine at P, with a fly-wheel and shaft P' and miter-gears $P^2$ $P^3$, to drive the shaft $P^4$ and miter-gears Q Q' $Q^2$, the gear Q' being fastened upon the cross-shaft $o^2$. There is a conical friction-coupling, $P^{10}$, upon the shaft $P^4$, as shown in Figs. 1 and 8. When this conical friction-coupling is moved endwise in one direction, the wheel Q is coupled to the shaft $P^4$ and the wheel $Q^2$ is loose, and the reverse, so that the shaft $o^2$ and screws H H' can be rotated in one direction or the other. I move the conical friction-coupling endwise upon the shaft $P^4$ by the action of the lever $p$, rod $p^2$, and hand-lever $p^3$, and it is generally preferable to extend the rod $p^2$ along near to one of the screws H, and to place upon such rod $p^2$ the movable tappets $p^{12}$, to be acted upon by an arm, $i$, extending out from the nut I, so that the nut will automatically change the conical friction-couplings by moving the tappets and rod, and thereby reversing the direction of rotation of the screws, and by adjusting the tappets the extent of movement of the nuts can be varied, and an up-and-down movement will be given to the disrupter to lift and break the rock. At the same time the disrupter and scow are drawn along by the action of the chain D' and windlass, and the rupture of the rock is continued in nearly a straight line. The windlass $D^4$ is upon a shaft having a gear-wheel, R, and above this is the screw-pinion R', the shaft of which has two bevel-pinions, $r\ r'$, upon it, and upon the shaft P' there are two bevel-gears, $r^3\ r^4$, each loose, but capable of being connected with and rotated by the shaft. For this purpose I use the conical friction-couplings S, that receive end motion from the lever $s'$, and when the wheel $r^4$ is coupled to the shaft P' there will be only a slow speed and great power applied to rotate the windlass and draw in the chain; but when the wheel $r^3$ is connected to the shaft P' (the wheel $r^4$ is disconnected) the motion given to the screw-pinion R' by the wheel $r^3$ is faster and the cable is paid out more rapidly. At the forward end of the vessel there is a projecting horizontal frame, T, (see Figs. 10 to 13,) within and upon which are guide-rollers $t$, and there is a frame composed of the side timbers, T', cross-piece $t^2$, near the top, and a cast-iron shoe, $T^2$, at the bottom. Upon the under side of this shoe there is a socket, $t'$, for the reception of the upper end of the anchor or spud. Within the frame there is a weight, $T^4$, similar to the weight or hammer of a pile-driver, and it is adapted to being raised and dropped, its edges being guided by the timbers T'. The hammer is provided with a driving-timber, $T^5$, and a metal head, $T^6$, which occupies the recessed upper surface of the shoe $T^2$.

Figure 14:
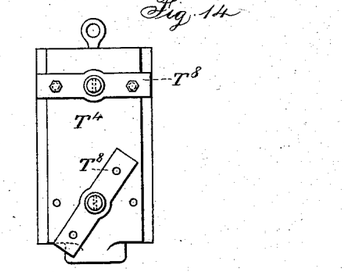
Fig. 14 is a separate view of the hammer.
Figure 15:
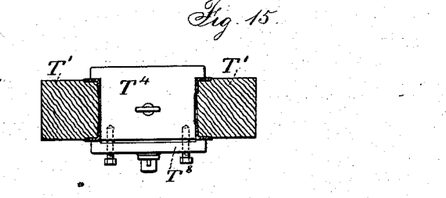

The means for lifting the hammer or weight $T^4$ and allowing the same to drop are not shown, as they are to be of any convenient character, and are similar to those used in an ordinary pile-driver. The spud or anchor is provided with a chain, $v$, which is slack when the anchor is in use and the rock is being broken up, as before described; but this chain is passed over the wheel or pulley $v'$ to a windlass, and used for drawing up the anchor when the position of the same is to be changed. When the anchor or spud is to be driven, the upper end thereof is placed in the socket $t'$, and the chain $v$ is used for lowering the anchor and the frame T' and connected parts until the anchor rests upon the rock or ground. The chain $v$ is slackened and the hammer $T^4$ raised and dropped until the spud has been driven to the desired depth. The chain $v^4$ that is attached to an eye upon the slide $T^2$ is now passed over the pulley $v'$ and to a windlass, and the frame T' and the parts connected therewith are lifted off the anchor and raised to any desired height, so as to be out of the way.

It is preferable to make the hammer $T^4$ with movable cross-bars $T^8$, that serve to keep it in position between the frames T' when in use, but which may be unbolted and removed or turned aside to allow the weight to be taken out of the frame T' and lowered upon the deck of the scow when the frame and hammer are not in use.

It is to be understood that when the spud has been driven in the proper place the scow is allowed to float off, or is propelled to the place where operations are to be commenced upon the rock. The chain D' being paid out, the frame and disrupter are lowered until the disrupter is at a depth to pass below the rock, the toggles G G' being almost vertical. The toggles are clamped, the screws H H' revolved, the toggles spread apart, and in so doing the disrupter is lifted, the rock broken, the direction of rotation of the screws reversed, so as to force the disrupter down again below the rock, the chain D' drawn upon to progress the plow or disrupter to its next position against the rock, and the operations are repeated.

It is generally preferable to drive down four spuds or anchors, and to stretch cross-chains between the pairs of anchors at the ends of the field to be gone over, and to attach the two ends of the chain D' to these cross-chains and draw the float and disrupter back and forth by the windlass $D^4$ acting on such chain. In this manner the scow and disrupter are kept in position and moved by the positive action of the windlass, and the ends of the chain D' connected with these cross-chains are changed in position from time to time.

It is to be understood that when commencing work the nuts I and cross-heads are to be drawn apart nearly to the ends of the screws H H', the disrupter lowered upon the rock, the parts are clamped, the screws rotated, the disrupter forced down into and through the rock, and then the disrupter be drawn back and forth to plow up the rock.

I claim as my invention—

1. The combination, with the disrupter, of a vertical frame to which the same is attached, a float, guides upon the float for the frame, an anchor, a chain passing from the same, a wheel on the frame, beneath which the chain passes, and a wheel on the float over which the chain passes to the windlass, substantially as set forth.

2. The disrupter, the frame for the same, the chain D′, and its chain-wheels, in combination with a clamp upon the frame for grasping the chain and raising the disrupter and frame, substantially as set forth.

3. The combination, with the disrupter, its frame, chain, and chain-wheels, of a hinged clamp, a sliding frame for opening or closing the clamp, a spring to force down the frame, and a chain to raise the same, substantially as set forth.

4. The combination, with the disrupter, its frame and chain-wheel, of the hinged clamp, the chain, the sliding frame to open and close the clamp, the chain or wire rope to operate the same, and the pulleys $f'\ f^2\ f^3$, and lever for moving the pulley $f^2$, substantially as set forth.

5. The combination, with the disrupter and its frame, of the hinged toggle-bars, the racks upon the bars, the boxes receiving the bars, and lever-clamp mechanism acting against the rack-teeth, the trunnions, nuts, right and left handed screws, and mechanism for rotating such screws, substantially as set forth.

6. The toggle-bars, racks, boxes, and clamps, in combination with the weighted levers to operate the clamps, the cross-shafts, rails, and means for raising and lowering the rails to actuate the clamps, substantially as set forth.

7. The combination, with the toggle-bars, boxes, and clamps, of the levers $k'$, the cross-bar $k^4$, the rollers $l$, rails $l'$, and bars $l^2$, the bent levers $l^5$, links $l^6$, rods $l^8$, and actuating-lever $l^9$, substantially as set forth.

8. The disrupter, its frame, the toggle-bars, nuts, and right and left handed screws, in combination with the gearing for actuating the screws and the coupling for disconnecting and connecting the reversing-gear, substantially as set forth.

9. The combination, with the disrupter and its frame, of the float, the guide for the frame, the chain, the chain-wheels, the chain-windlass, and the gearing for giving a slow powerful movement in drawing in the chain and a more rapid movement in paying out the chain, substantially as set forth.

Signed by me this 4th day of June, A. D. 1884.

T. F. LONNEY.

Witnesses:
GEO. T. PINCKNEY,
HAROLD SERRELL.